United States Patent [19]

Harper

[11] Patent Number: 4,786,073
[45] Date of Patent: Nov. 22, 1988

[54] FOLDABLE TRAILER

[76] Inventor: Cliff Harper, 1123 40th St., S.E., Calgary, Alberta, Canada, T2A 1J7

[21] Appl. No.: 947,852

[22] Filed: Dec. 30, 1986

[51] Int. Cl.$^4$ .............................................. B62D 63/00
[52] U.S. Cl. .................................. 280/656; 280/491 R
[58] Field of Search .................. 280/656, 639, 491 R, 280/491 B; 16/386; 296/173, 174

[56] References Cited

U.S. PATENT DOCUMENTS

| | | | |
|---|---|---|---|
| 3,288,521 | 11/1966 | Patnode | 296/173 |
| 3,627,352 | 12/1971 | Canole | 280/491 B |
| 4,239,258 | 12/1980 | Burris | 280/639 |
| 4,372,568 | 2/1983 | Campbell | 280/491 B |
| 4,485,544 | 12/1984 | Van Ryswyk | 16/386 |

*Primary Examiner*—John J. Love
*Assistant Examiner*—Donn McGiehan
*Attorney, Agent, or Firm*—Burke-Robertson

[57] ABSTRACT

A foldable trailer having a frame and platform which are laterally divided into a front, rear and central section, the axle of the trailer being secured to the central section. The central section is pivotally connected respectively to the front and rear sections so that the front and rear sections can fold up into storage positions normal to that of its central section. The front and rear sections are releasably lockable with the central section so that they are in the same plane as that of the central section during operative use of the trailer. An improved hinge is provided to permit tight fitting of the confronting surfaces of the sections when the sections are in position for operative use and to permit and unobstructed pivoting of the front and rear sections with respect to the central section when they are being folded into storage position. The trailer according to the present invention provides a sturdy platform during operative use, yet permits it to be collapsed for storage or transportation.

12 Claims, 3 Drawing Sheets

FOLDABLE TRAILER

BACKGROUND OF THE INVENTION

The present invention relates to a foldable trailer and more particularly to a trailer of the type having a normally horizontal frame, a platform secured to and carried by the frame and an axle with wheels, for transporting goods behind an automobile or like vehicle.

Trailers of the type having a platform surface, generally enclosed with walls and a roof, and having at least one pair of wheels with an axle secured below the platform surface, are commonly used for commercial or domestic transportation purposes to carry a wide range of goods from one place to another, behind a car, van, small truck or the like. Most often, such trailers are rented through car or trailer rental organizations. A hitch mechanism is secured to the bumper of the renter's vehicle, and the trailer is secured to that hitch. The renter then returns the hitch and trailer either to the same location or, when the renter for example is moving from one city to another, to a different location operated by the renting company, in the other city. This latter situation has created a problem for rental companies operating on a national basis, since an abundance of trailers may develop in a particular city and a scarcity in another, for example because economic conditions in one region of a country may be such as to create either an inflow or an outflow of persons many of whom rent such trailers to transport their positions when the move. Because of the bulky and unwieldly nature of such trailers, it becomes very expensive, and often uneconomical, for the rental company to ship their trailers from a city in which there is an over-abundance of such trailers to one in which there is a scarcity. Such transportation would traditionally be by train or by transport truck. Because of the space taken up by the trailers in question, the transportation costs of such trailers from one city to another may well be prohibitive.

Thus, a trailer which would collapse into a minimal amount of space would be an extremely desirable product for such rental companies, since it would permit a significantly greater number of trailers to be transported in a given space on a truck or train. This would mean that transportation of a number of trailers from an area where there was an overabundance of them to an area requiring more trailers would become economical.

The concept of a collapsible trailer or the like cannot be regarded as being new. For example, in Canadian Pat. No. 252,506 issued Aug. 11, 1925 to Gleissner, there is described a collapsible trailer of the type in question which may be readily knocked down and carried, for example, on the running board of a car of that vintage. Such previous attempts to provide a collapsible trailer however have not been commercially successful however because of several significant problems. Firstly, the collapsing mechanism has oftentimes been extremely expensive and complicated to bring into practice. For example, in the Gleissner patent, the trailer collapses along a longitudinal line so that provision must be made for collapsing of portions of the axle. In addition, such collapsing trailers would not be suitable for modern day standards where rigidity and security of the trailer during normal operation must be achieved while at the same time maintaining the trailer platform, if the trailer is to be enclosed, free from dirt or moisture which might otherwise enter the trailer along the lines where it collapses.

Thus it is an object of the present invention to provide a simple and economical construction of collapsible trailer of the type in question. It is a further object of the present invention to provide such a collapsible trailer which will fold up into a fraction of its normal, operative size. It is a further object of the present invention to provide such a trailer which, when in fully operative position, will be both rigid and effective in keeping moisture, dust and other foreign objects away from the platform area or the enclosed space above the space.

SUMMARY OF THE INVENTION

In accordance with the present invention there is provided a foldable trailer. The trailer comprises a normally horizontal frame having sides and front and rear ends, a platform secured to and carried by the frame in normally horizontal position, an axle secured to the frame intermediate the front and rear ends, and extending laterally with respect to the frame, wheels rotatably secured to the axle, and a hitch secured to the front end of the frame. The improvement is characterized by the frame and platform being laterally divided into front, rear and central sections. The axle is secured to the central section. The central section is pivotably connected respectively to the front and rear sections by hinge means whereby the front and rear sections fold up into storage positions normal to that of the central section. Releasable locking means are provided to secure the front and rear sections in the same plane as that of the central section during operative use of the trailer.

In a preferred embodiment, rigidity of the sections when in operative position is achieved using hinge means comprises hinges secured to the upper surface of the platforms of the front, rear and central sections. The hinges each have a pivot spaced above the platform a predetermined distance. This permits tight fitting of confronting surfaces of the sections when the sections are positioned in the same plane for operative use and permits free and unobstructed pivoting of the front and rear sections with respect to the central section when these sections are folded up into storage positions.

In yet another preferred embodiment of the present invention, impermeable gasket means are secured to the frame below the platform. The gasket means are positioned where the frame and platform are laterally divided to provide a seal, when the sections are positioned in the same plane for operative use, against moisture, dust or foreign objects entering the upper platform surface from below.

The trailer in accordance with the present invention may be used in association with removable wall sections for enclosing the space over the platform. The trailer collapses for storage or for mass transportation purposes, into a structure taking up significantly less floor space, making the trailer suitable for transportation by rail or truck between different cities on an economical basis. Yet, when the trailer is in operative position, it provides an extremely rigid platform onto which, when the aforementioned gasket means is used in its construction, little or not moisture, dirt or dust may enter from below.

BRIEF DESCRIPTION OF THE DRAWINGS

These and other objects and advantages of the invention will become apparent upon reading the following detailed description and upon referring to the drawings in which.

Figure 1:
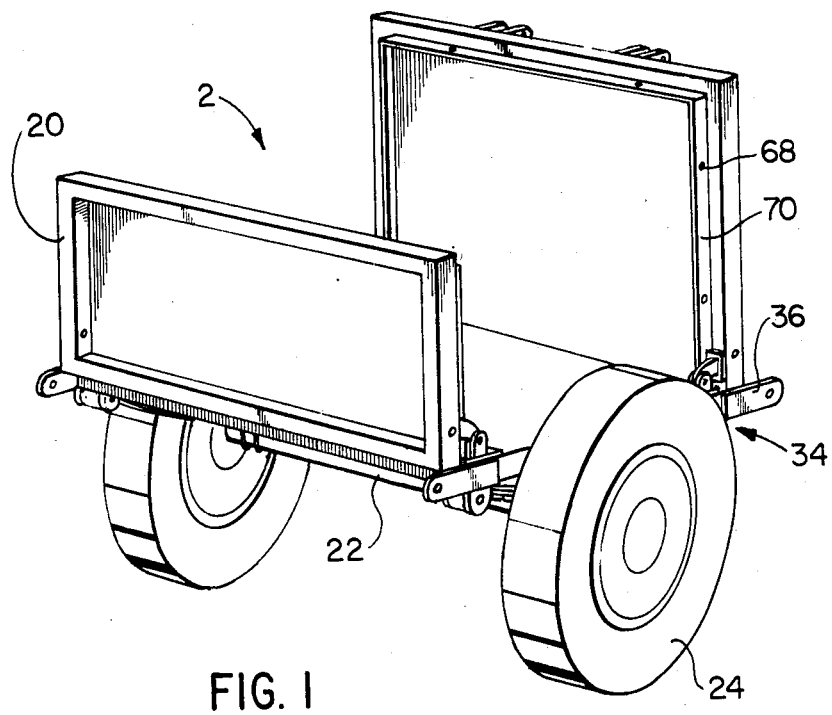
FIG. 1 is a perspective view of a trailer in accordance with the present invention in folded position.

While the invention will be described in conjunction with an example embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE INVENTION

In the following description, similar features in the drawings have been given similar reference numerals.

Figure 2:
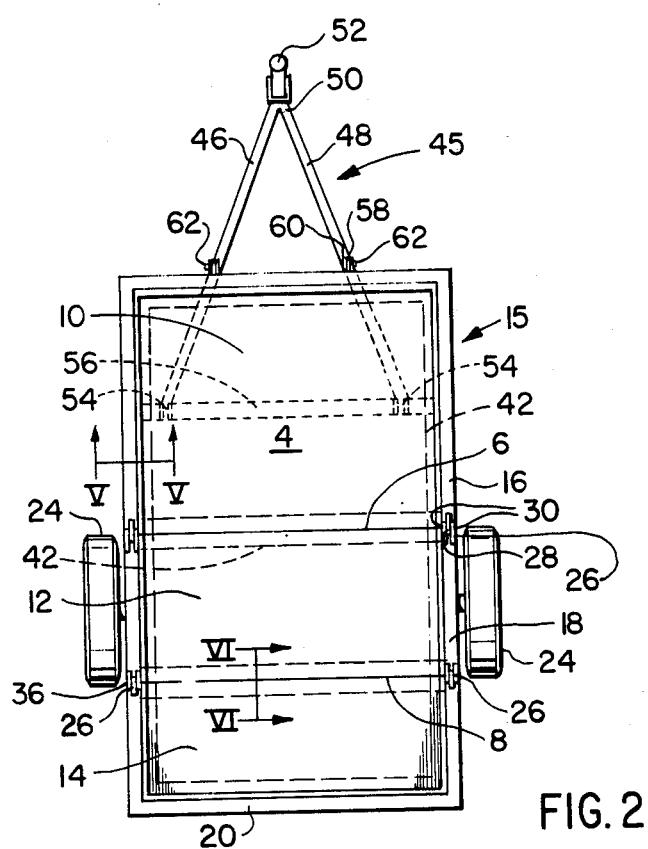
FIG. 2 is a plan view of the trailer of FIG. 1, in open, operative position.

Turning to FIG. 1 there is shown a trailer 2, in collapsed or folded position for storage or transportation, comprising a platform 4 made of plywood or another other appropriate material to provide a surface upon which goods to be transported within the trailer are supported, the platform being in normally horizontal position as shown in FIG. 2. Platform 4, as seen in FIG. 2, is laterally divided along lines 6 and 8 into a front platform section 10, central platform section 12 and rear platform section 14. A frame 15, which may for example be of appropriate metal and made of a square beam 15a welded to an angle iron 15b (FIG. 5), circumscribing and supporting platform 4 as shown in FIG. 2. Again, corresponding to the divisions of platform 4, frame 15 is divided into front frame 16, central frame 18 and rear frame 20, with appropriate transverse frame sections (as illustrated, e.g. in FIG. 1) supporting these frame sections to divide the frame along lines 6 and 8 and permit folding of the frame as illustrated in FIG. 1.

To central frame section 18 is secured an axle 22 (FIG. 1) on which are rotatably supported wheels 24.

Figure 3:
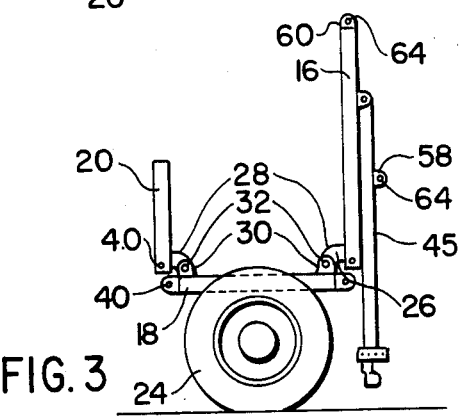
FIG. 3 is a schematic side view of the trailer of FIG. 1.
Figure 4:
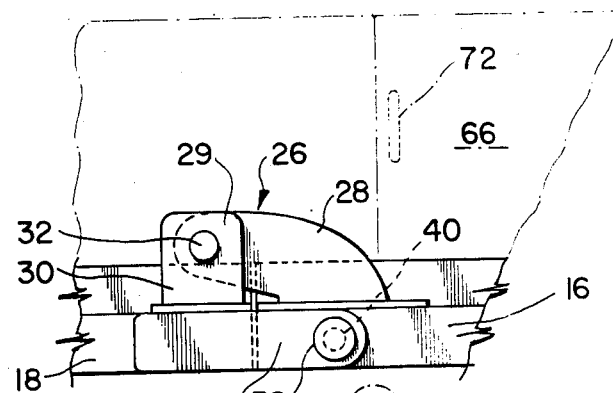
FIG. 4 is a side, detail view of the hinge and locking mechanism between adjacent sections of the trailer of the preceding FIGURES.

To central platform section 12 and corresponding frame section 18 are hinged front and rear sections of the trailer by means of hinges 26 secured on top of square beams 15a about the periphery of the trailer. These hinges 26, as can be seen, for example, FIGS. 2 and 4, each consist of upwardly extending member 28 secured to one of the frame sections (front section 16 as illustrated). Member 28 has a portion 29 which overhangs the adjacent frame section when the frame sections are in operative position as illustrated in FIG. 4. An upwardly extending member 30, comprising a pair of spaced ears 30 secured to central frame section 18 and between which ears portion 29 of member 28 is secured by means of pivot 32 is provided. This hinge mechanism permits the front and rear sections to fold up, as illustrated in FIG. 3, into storage positions normal to that of the central section. This type of hinge construction, because of the overhang of portion 28 and the location of pivot 32, being spaced above the upper surface of platform 4, permits a tight fitting of the confronting surfaces of adjacent sections when the sections are positioned for normal use as shown in FIG. 4, while at the same time permitting free and unobstructive pivoting of the front and rear section with respect to the central section when they are folded into storage position. As can be seen in FIG. 2, a hinge mechanism 26 of the type in question is provided between each section on either side of dividing lines 6 and 8.

Of course, if desired, any appropriate lock means 33 may be provided to secure and maintain the front and rear platform and frame sections in folded position as illustrated in FIG. 3.

Turning to FIGS. 1, 3 and 4, along the outside of frame 15 are secured locking means 34 consisting of bars 36 secured to central frame 18 and forwardly and rearwardly extending across lines 6 and 8 to the adjacent section, when the sections are positioned in the same plane as shown in FIG. 4. Pins 38 are provided to pass through aligned holes 40 in bars 36 (in FIG. 4) the corresponding portion of front frame section 16. When pin 38 is seated in holes 40 of bar 36 and the corresponding confronting, adjacent frame section, the sections are securely positioned in the same plane. It will be understood from FIG. 4 that little relative vertical or horizontal relative motion of the adjacent sections of the platform and frame are permitted, the cooperation of pivot 32 and pin 38 significantly impeding any relative movement of the adjacent sections in either or any direction.

Figure 5:
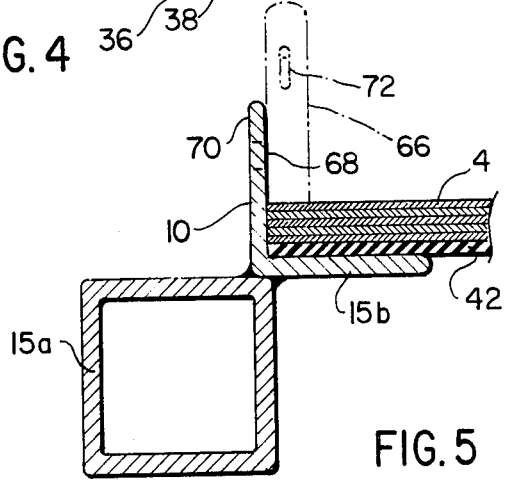
FIG. 5 is a section view along line V—V of FIG. 2.
Figure 6A:
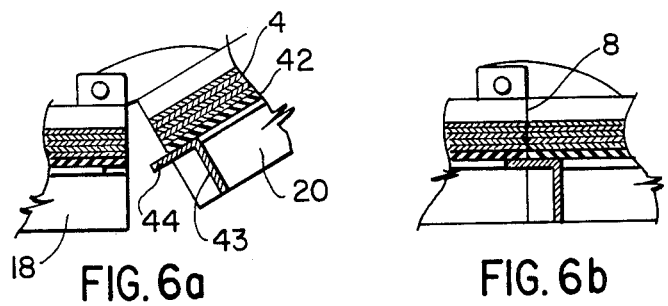
FIG. 6a and 6b are detail section views along line VI—VI of FIG. 2, showing adjacent sections of the trailer pivoting into place or operative position.
Figure 6B:
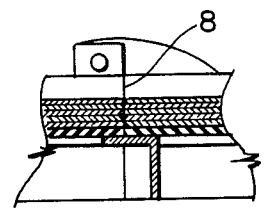

As can be seen in the cross-sectional detail of FIGS. 5 and 6a and 6b, a gasket 42 made of an appropriate rubber or like material underlies the platform 4 and, particularly, extends between frame 15 and platform 4 as shown in phantom in FIG. 2, transversely across the trailer beneath lines 6 and 8 and about the periphery of platform 4. This gasket 42, being of an impermeable, resilient nature, acts to seal the crack formed by divisions lines 6 and 8 between the respective frame and platform sections to seal against any moisture, dust or foreign objects entering the upper platform surface from below when the sections are positioned in the same plane for normal use of the trailer. As can be seen in FIG. 6a, this seal is further assisted by the fact that angle iron 43 which acts as a transverse member extending laterally across frame section 20, has a surface position directly below division line 8, frame section 18 being notched accordingly, as illustrated, to receive outwardly projecting portion 44 of this angle iron.

At the front of trailer 2, as can be seen in FIG. 2, is secured a foldable hitch bar 45 consisting of a pair of cooperating bars 46 and 48 joined at their front end 50 where a hitch mechanism is secured. At their other ends, bars 46 and 48 are secured at pivot 54 to transverse frame member 56 extending laterally across front frame section 16. As can be seen in FIGS. 2 and 3, hitch bar 45 is thus permitted to pivot about a laterally extending axis formed through pivots 54, between operative position, forwardly extending in a plane parallel to that of the platform (as illustrated in FIG. 2) and storage position, 180° opposite thereto (as illustrated in FIG. 3). When hitch bar 45 is intended to be in its operative position, it is secured in that position by mating locking ears 58 and 60 secured respectively to bars 46 and 48, and to the front edge of front frame 16, by means of removable pins 62 passing through appropriately aligned holes 64 (FIG. 3). It will be readily appreciated from FIGS. 2 and 3 that when pins 62 are removed from ears 58 and 60, platform 4 is then free to tilt about axle 22. This may be a desirable feature for loading of platform 4, for example, with heavy objects from the rear, since the rear of platform 4 can be thereby tilted towards the ground while the trailer is hitched to a vehicle.

While the trailer according to the present invention has been described and illustrated as having only a platform, it is clearly envisaged, and indeed to be preferred, that the trailer will have associated with it conventional releasable wall sections 66 (phantom in FIG. 5, for example) with appropriate conventional means for releasably securing the bases of these walls with respect to slots 68 in the upwardly extending portions 70 of angle irons 15b (FIG. 5). Again, using conventional techniques, these walls (including sealing sections) may be releasably locked together by means of any appropriate locking mechanisms 72 (phantom FIG. 5) along their peripheries, to provide a secure enclosure for the space above platform 4. Of course, in a preferred form, these wall sections would be planar in shape and could be stored or transported when the trailer is in folded position, as illustrated in FIG. 3, by being stacked on central platform section 12 between folded rear platform section 14 and front section 10.

Thus it is apparent that there has been provided in accordance with the invention a foldable trailer that fully satisfies the objects, aims and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. In a foldable trailer comprising a normally horizontal frame having sides and front and rear ends, a platform secured to and carried by the frame in normally horizontal position, the frame being circumscribed by an upstanding flange, the flange to removably receive base portions of wall sections for enclosing a predetermined space above the platform, an axle secured to the frame intermediate the front and rear ends, and extending laterally with respect to the frame, wheels rotatably secured to the axle, and a hitch secured to the front end of the frame, the improvement characterized by the frame and platform being laterally divided into front, rear and central sections, the axle being secured to the central section, the central section being pivotably connected respectively to the front and rear sections by hinge means whereby the front and rear sections fold up into storage positions normal to that of the central section, releasable locking means being provided to secure the front and rear sections in the same plane as that of the central section during operative use of the trailer, and impermeable gasket means being secured to the frame below the platform, the gasket means being positioned where the frame and platform are laterally divided to provide a seal, when the sections are positioned in the same plane for operative use, against moisture, dust or foreign objects entering the upper platform surface from below.

2. A trailer according to claim 1 wherein the hinge means comprises hinges secured to the upper surface of the platforms of the front, rear and central sections, the hinges each having a pivot spaced above the platform a predetermined distance to permit tight fitting of confronting surfaces of the sections when the sections are positioned in the same plane for operative use and to permit free and unobstructed pivoting of the front and rear sections with respect to the central section when these sections are folded up into storage positions.

3. A trailer according to claim 2 wherein each hinge consists of an upwardly extending member secured to one section with a portion thereof overhanging and pivotably secured to an upwardly extending member secured to the other section.

4. A trailer according to claim 3 wherein the hinges are positioned proximal to the sides of the trailer frame.

5. A trailer according to claim 1 in combination with wall sections having releasable securing means about their peripheries for removable attachment to the upstanding flanges and to each other, for enclosing a predetermined space above the platform.

6. A trailer according to claim 1 wherein the releasable locking means comprises a locking bar secured to the frame of one section, proximal to an adjacent section and having a portion extending across and adjacent to that adjacent section when the sections are positioned in the same plane for normal use, and means to releasably secure said one portion of the locking bar to said adjacent section, one of such locking means being positioned on each side of the trailer where the frame and platform are laterally divided.

7. A trailer according to claim 6 wherein said means to releasably secure said one portion of the locking bar to said adjacent section consists of a pin to fit into aligned holes in said portion of the locking bar and said adjacent section.

8. A trailer according to claim 1 wherein the releasable locking means comprises a locking bar secured to the frame of one section, proximal to an adjacent section and having a portion extending across and adjacent to that adjacent section when the sections are positioned in the same plane for normal use, and means to releasably secure said one portion of the locking bar to said adjacent section, one of such locking means being positioned on each side of the trailer where the frame and platform are laterally divided.

9. A trailer according to claim 8 wherein said means to releasably secure said one portion of the locking bar to said adjacent section consists of a pin to fit into aligned holes in said portion of the locking bar and said adjacent section.

10. A trailer according to claim 1 wherein the hitch comprises a bar carrying a hitch means at one end and pivotally secured at the other end to the frame at a position near to but spaced rearwardly from the front of the frame, the bar to pivot about a laterally extending axis between operative position forwardly extending in a plane parallel to that of the platform and storage position 180° opposite thereto, and cooperating locking means secured to the frame and the bar to releasably secure the bar in operative position.

11. A trailer according to claim 10 wherein the bar is formed by a pair of cooperating bars joined at their front and spreading rearwardly outwardly to the rear where they are pivotally secured to the frame.

12. A trailer according to claim 1 wherein the gasket means is made of either rubber or rubber-like material.

* * * * *